Oct. 12, 1943. R. E. WALLACE 2,331,818
BALING MACHINE
Filed Dec. 23, 1940 8 Sheets-Sheet 1

Inventor
Richard E. Wallace
by
atty

Oct. 12, 1943.  R. E. WALLACE  2,331,818
BALING MACHINE
Filed Dec. 23, 1940  8 Sheets-Sheet 6

Inventor
Richard E. Wallace.

Patented Oct. 12, 1943

2,331,818

UNITED STATES PATENT OFFICE 2,331,818

BALING MACHINE

Richard E. Wallace, Toronto, Ontario, Canada, assignor to The Toronto Star Limited, Toronto, Ontario, Canada Application December 23, 1940, Serial No. 371,455

23 Claims. (Cl. 100—31)

The principal objects of this invention are to provide a machine particularly adapted for the baling or bundling of newspapers or other compressible material, by means of which varying sized bundles may be securely bound in such a manner that the inconveniences, loss of time and damage through the breaking of wrappings will be avoided and will secure the papers in closely packed secure bundles which will greatly facilitate their handling in delivery and will prevent pilfering.

A further and important object is to devise a machine which will automatically compress the material to a tight, compact bundle, measure and cut lengths of wire in accordance with the size of the bundle, wrap the same about the bundle without injury to the material and weld the ends of the wire in a snug wrapping contact.

The principal features of the invention consist in the novel construction of the machine and the arrangement of co-operating mechanisms whereby a pressure ram is operated to compress the material upon a fixed table, and means connected with the ram to automatically measure and cut a length of wire to surround the bundle concurrently feeding the wire beneath the bundle, and immediately following the cutting of the length of wire, the ends thereof are bent upwardly along the sides of the bundle and then inwardly over the top thereof with the ends in overlapping arrangement, and the overlapping ends are gripped and electrically welded together on top of the bundle.

A further important feature consists in the novel construction and arrangement of the wire-measuring and feeding mechanism and the means for returning same to a normal position following the cutting operation.

A still further important feature consists in the means for operating and controlling the welding mechanism and the flow of current therethrough.

In the accompanying drawings

It is well known to those who are conversant with the operation of the newspaper business that many difficulties, delays and much expense are caused by the insecure method of bundling papers for delivery using twine to secure the bundles. Further, the methods of wire binding at present in use have many undesirable features and it is highly desirable to provide means for overcoming the deficiencies of these present methods.

The bundling of newspapers involves many problems and the present invention has been developed to provide a machine which will successfully wrap and bind securely bundles of varying sizes so that they will not only hold securely and prevent pilfering but in such a manner that the papers will not be cut or damaged by the binding wires.

The form of the invention herein shown discloses the main press structure as supported on a frame 1 composed of a pair of uprights 2 which are rigidly connected together at the top by a cap structure 3 and they are also connected intermediate of their height by the bed plate 4.

A hydraulic or air cylinder 5 is rigidly mounted on the cap 3 centrally of the width of the frame, and a piston rod or ram 6 extends downwardly therefrom and supports the cross head member 7 which has a flat bottom plate arranged parallel with the bed 4 and operates in sliding contact with the uprights 2 and is moved toward and from the bed plate by the operation of the ram to press the papers which may be placed upon the bed plate into a compact bundle and to withdraw the crosshead to release the bundle.

A horizontal bar 8 is secured to the front edge of the bed plate 4 and is provided with a groove 9 (Figures 5 and 6), in the top thereof, in which the binder wire is guided to pass underneath the bundle resting on the bed plate. The right hand end of the groove is widened and slidably supports a narrow grooved bar 10 mounted on a bracket plate 11 which is slidably held between the bevelled edges of the bar 8 and a similar parallelly arranged bar 12 also secured to the bed plate.

The bracket 11 is moved horizontally to the right or left by means here shown as a spindle 13 (Fig. 5) threaded in a block 14 mounted on the frame, the spindle being provided with a hand wheel 15. The reason for this lateral or transverse shift is to adjust the mechanism in accordance with the variation in the width of the bundle.

A plate 16 is mounted to slide vertically on the bracket plate 11 at its innermost side adjacent to the right hand upright 2 of the frame, and it is operated by a piston or ram 17 connected to an angle bracket 17' mounted on the plate 16. The ram 17 operates in a cylinder 18 carried in a frame 18' mounted on the bracket plate 11. The inner vertical edge and the top edge of this plate 16 is grooved in alignment with the grooved bar 10 to receive the binding wire. A cylinder 19 is rigidly mounted on the other upright of the frame and carries a ram 20 similar to the ram 17, and the ram 20 is secured by an angle bracket 21' to a plate 21 which is slidably mounted in a vertical grooved slot 22 in the upright of the frame.

The plate 21 is formed with a grooved vertical inner edge to receive and hold the wire in a vertical position when the plate is moved upwardly and it also has a horizontal groove 23 in the top edge thereof (see Figure 6) which corresponds with the groove 9 in the top of the bar 8 and which is slightly deeper than said groove 9, so that when the plate 21 is moved upwardly by the operation of the ram 20, the wire W, which will have been projected through the slot 9 and beyond the end of the plate 8, will fit into the groove 23.

The upper and inner corner of the plate 21 is cut away to form a longitudinal notch 24 and in this notch is pivotally mounted a block 25, the pivot pin 26 of which is arranged below the bottom of the notch, and the top end of the block is formed with a groove which forms a continuation of the groove 23. A pin 27 projects outwardly from the block 25 and is engaged by a cam bar 28 mounted on the cross head 7, so that when the pin is engaged by the curved face of the cam, the block 25 will be swung inwardly.

A gripper dog 29 is pivotally mounted in a notch formed at the end of the bar 8 adjacent to the vertically sliding plate 21 and is adapted to be swung on its horizontal pivot so that the upper end will grip the wire W when it has been placed in the slot 9. The tail or lower end of the dog 29 is formed with a wedge end 30 which is engaged by a bevelled plate 31 mounted on the plate 21 as the plate 21 moves upwardly. The operation, therefore, is that immediately the upward movement of the member 21 commences, through the action of the ram 20, the dog 29 grips the wire securely at the end of the groove 9. The upward movement of the plate 21 brings the slot 23 upwardly to receive the outwardly extending end of the wire and immediately thereafter, the inner corner of the block 25 mounted on the member 21 engages and bends the wire upwardly in a sharp right-angle bend which, because of the wire being gripped by the dog 29, will not exert any upward pressure against the bottom corner of the bundle of papers laid upon the bed plate.

Figure 4:
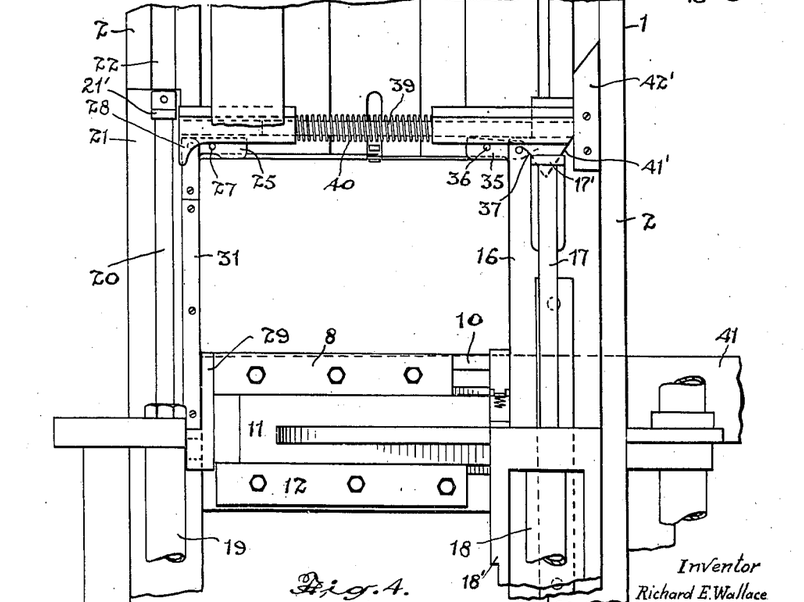
Figure 4 is an enlarged elevational detail of a portion of the front of the machine showing the arrangement of the parts with the ends of the baling wire bent to be brought together over the top of the bundle and in position to be welded.

The member 21 continues to move upwardly supporting the wire in its grooved vertical edge, and as it comes opposite to the bottom of the ram crosshead 7, the curved cam member 28 engages the pin 27 projecting from the block 25 swinging the block inwardly on the pivot pin 26. This inward swinging movement bends the wire inwardly over the top of the bundle as is shown particularly in Figure 4.

Figure 5:
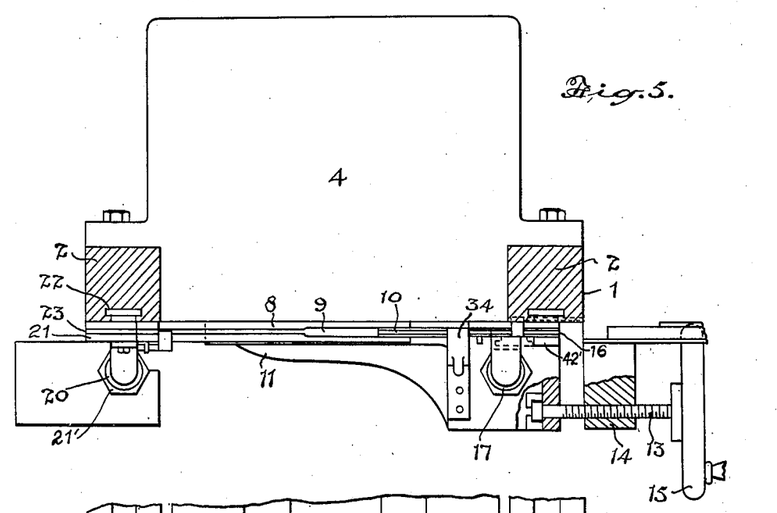
Figure 5 is a horizontal plan sectional detail taken on the line 5—5 of Figure 2 and broken away in part to better disclose the transverse adjustment means for adapting the structure to bundles of various width.

Concurrently with the operation of the member 21 and the ram 20, the ram 17 moves the plate 16 upwardly and the other end of the length of wire, which has been measured, in a manner which will hereinafter be described, and cut to the proper length, is bent upwardly at right angles over the pivotal plate 34 shown in Figure 5.

The slidable plate 16 has mounted adjacent to its upper end, a pivotal block 35 similar to the block 25. This block has a projecting pin 36 which engages the cam member 37 mounted on the ram crosshead 7 and corresponding with the cam 28. The cam member 37 is slidably mounted on a horizontal bar 39 mounted on the front face of the crosshead and operates against a compression spring 40 surrounding said bar and arranged between the cam block 28 and the block 37. The slidable arrangement of the cam 37 is provided in order to accommodate the mechanism to different widths of bundles for which adjustment of the frame 16 is provided in the hand wheel 15 and spindle 13.

A bevelled cam 41' on the outward end of the member 37 presents an outwardly bevelled surface which is engaged by a bevelled block 42' mounted on the plate 16, so that as the plate 16 is raised through the operation of the ram 17, the block 42' engages the surface 41' pushing the cam member 37 inwardly to the desired position so that when the plate 16 moves slightly further upwardly, the pin 36 of the wire bending block 35 will engage the inside surface of the cam 37 thus swinging the block 35 inwardly to bend the wire horizontally over the top of the bundle.

The wires are cut to such a length that the ends thereof overlap slightly about midway of the top of the bundle where they are gripped and welded together by a mechanism which will hereinafter be described.

The wire is fed to the groove bars 10 and 3 along a grooved bar 41 which extends horizontally outward from one side of the frame 1 and slidably mounted on the bar 41 on a suitable carriage is a cutting device 42. This cutting device is caused to travel upon the bar 41 by means of a cable connection with the ram crosshead 7. A lug 43 on the ram crosshead 7 Figures 1, 2 and 3, has a cable 44 connected thereto which extends upwardly alongside the frame 1 and over a pulley 45. The cable extends downwardly parallel to the frame around the pulley 46 from whence it passes underneath the bed plate 4 and around a pulley 47 which is mounted on the back of the bracket 11 so that transverse movement of the bracket to accommodate different widths of bundles will alter the length of the cable.

Figure 9:
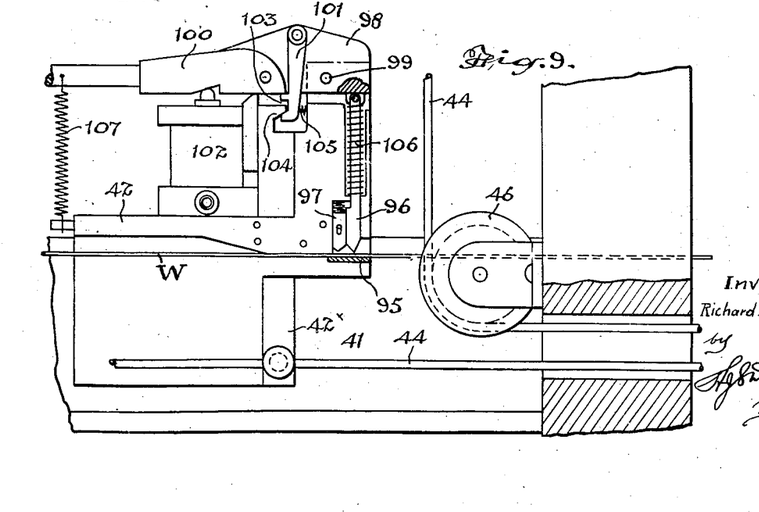
Figure 9 is an enlarged part sectional elevation of the wire-cutting mechanism showing its connection with the measuring device.
Figure 10:
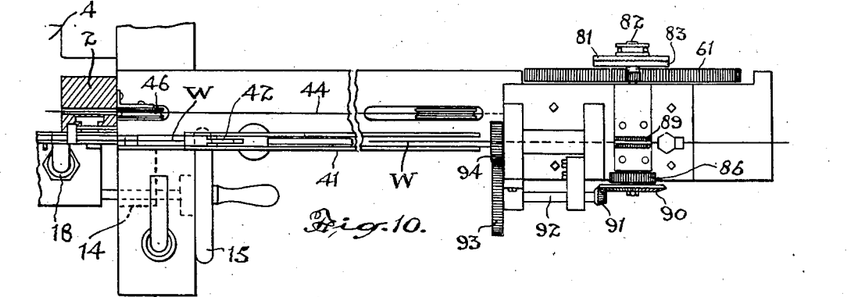
Figure 10 is a plan view of the wire-feeding mechanism and part of the bundling press.
Figure 13:
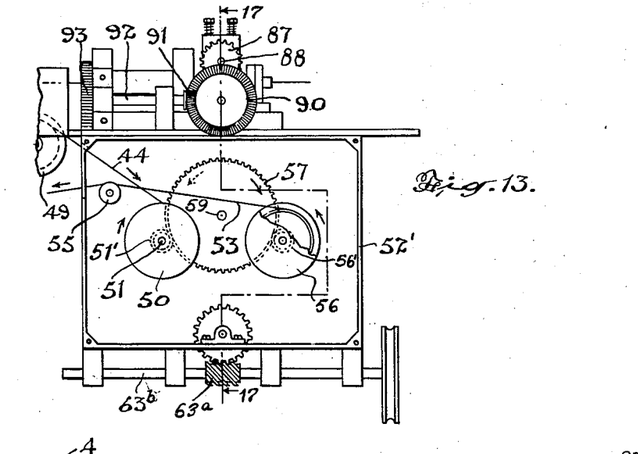
Figure 13 is an elevational view of the opposite side of the wire-feeding device to that shown in Figure 11.
Figure 14:
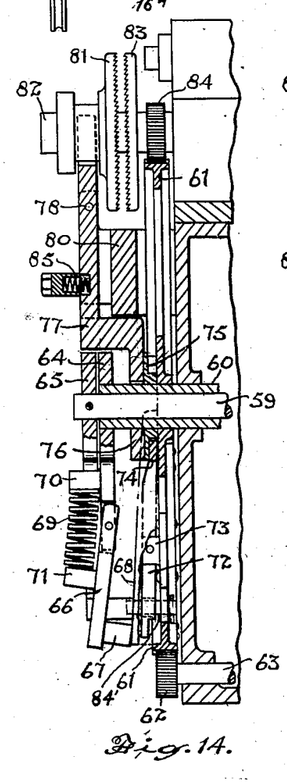
Figure 14 is an enlarged part sectional elevation of the wire feed control taken on the line 14—14 of Figure 11 showing the clutch for operating the wire feed in the open position.
Figure 15:
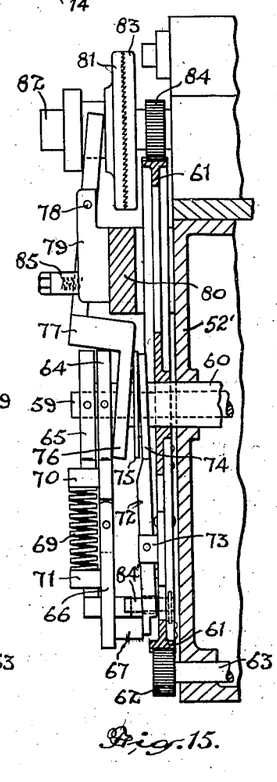
Figure 15 is a view similar to Figure 14 showing the position of the break joint of the clutch-operating arm and the co-operating parts when the clutch is closed to operate the wire feed.
Figure 16:
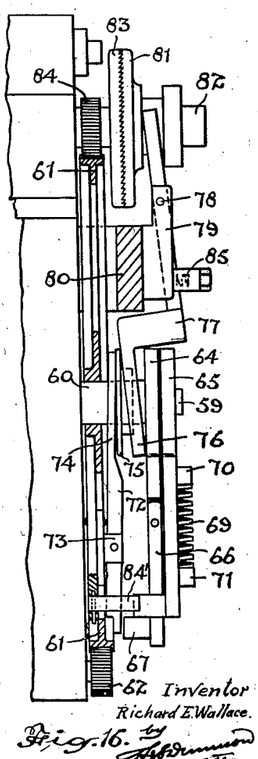
Figure 16 is a view similar to Figure 14 taken on the line 16—14 of Figure 11 but showing the clutch closed.

After passing around the pulley 47, the cable passes over an idler pulley 48 and extends horizontally beside the member 41, passing over a pulley 49 adjacent the outward end of the member 41. The cable is secured to a downward extension 42x from the sliding carriage of the cutter 42 (see Figure 9) so that the cutter moves with the cable. The cable, after passing over the pulley 49 extends angularly downward and is wound around a drum 50 mounted on a spindle 51 in a frame 52' (see particularly Figures 1, 13 and 17).

Spring tension is applied to the drum 50 to maintain the cable taut and to wind it upon the drum in one direction through a spiral spring. A length of cable 53 is secured to the lug 43 of the ram crosshead 7 and extends downwardly and under a pulley 54 mounted on the frame 1, from whence it extends underneath the member 41 over an idler 55 and is wound on a drum 56 adjacent to the drum 50. The drum 56 is mounted on a spindle which is also spring-actuated by spring 52 (see Figure 17) to wind up the slack similarly to the drum 50.

It will be noted that when the ram 7 rises, the cable 44 moves in an outward direction in the guideway 41 and is wound up by the spring-actuated drum 50, while the cable 53 is pulled away from the drum 56.

Figures 6, 17, 19:
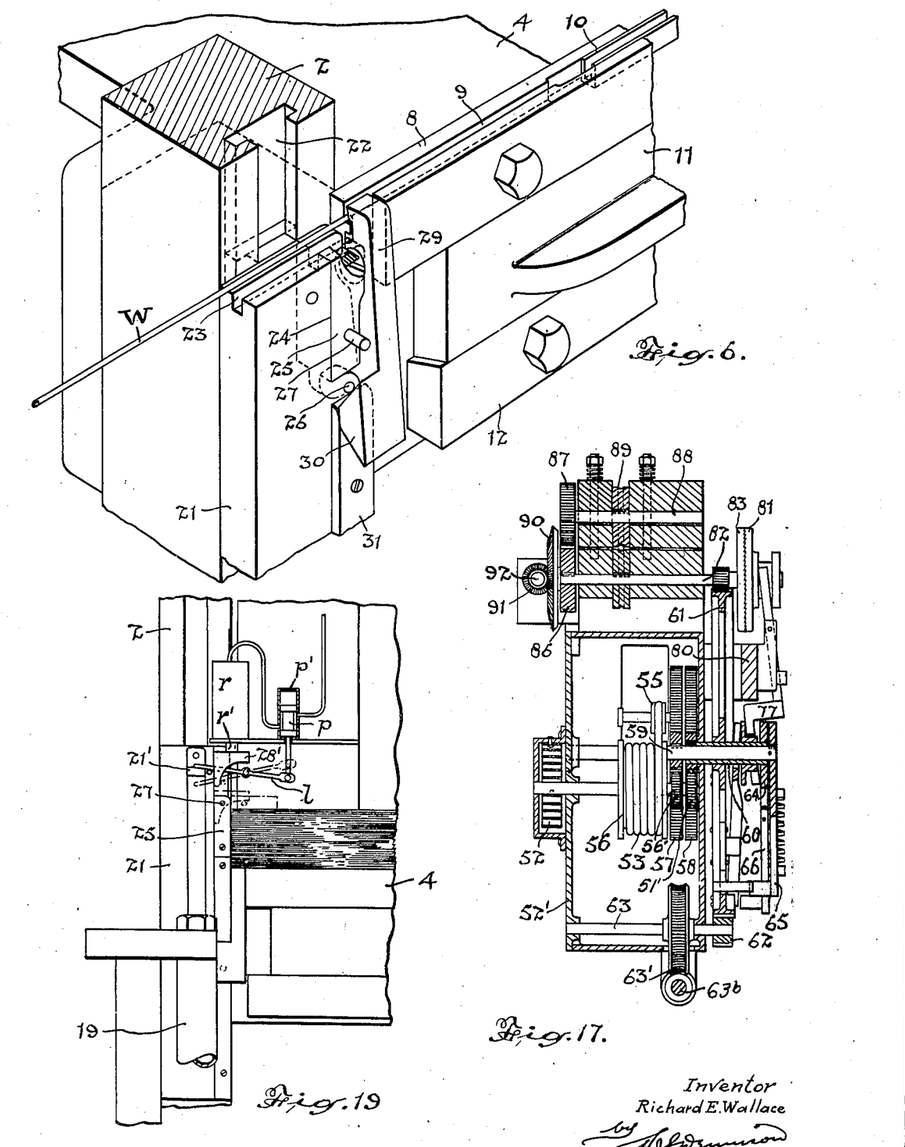
Figure 6 is an enlarged sectional perspective detail showing part of the mechanism as illustrated in Figure 5, and particularly illustrating the manner of gripping and holding the wire to accomplish a right-angle bend without pressure against the bundle.
Figure 17 is an enlarged vertical sectional view taken on the line 17—17 Figure 13 transversely through the wire-feeding mechanism.
Figure 19 is an enlarged elevational view of a modified form of means for bending the wire over the top of the bundle.
Figures 6A, 22:
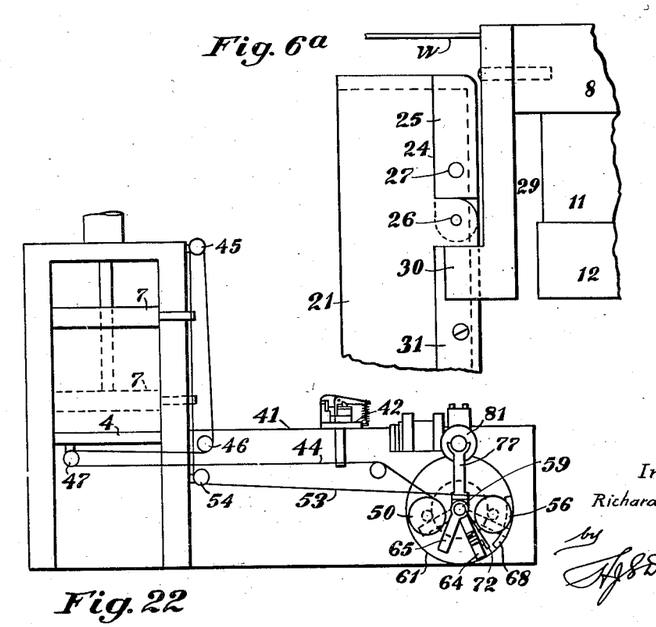
Figure 6a is an elevational detail of the left-hand portion of Figure 6 showing the wire-gripping dog and the pivotal wire-bending block.
Figure 22 is a schematic diagram illustrating the movement of the wire feed control mechanism relating to the press ram.

The spindle 51 of the drum 50 has mounted on one end thereof a spur pinion 51' which meshes with a gear 58, and the spindle of the drum 56 has a pinion 56' meshing with a gear 57 (see Fig. 17). These gears are arranged side-by-side, one of which, 57, is mounted on a shaft 59, and the gear 58 is mounted on a hollow shaft 60 which encircles the shaft 59. Both of these shafts are supported in bearings in the supporting casing 52'.

A spur gear 61 is rotatably mounted on the hollow shaft 60. This gear meshes with a pinion 62 mounted on a shaft 63 journalled in the frame 52' and the shaft 63 is driven by a worm gear 63' having a driving worm 63a mounted on a transverse shaft 63b which is connected with an electric motor M.

An arm 64 is rigidly mounted upon the hollow shaft 60 and turns in direct relation to the operation of the gear 58 controlled by the cable 44 connected to the ram of the press. An arm 65 is rigidly secured to the shaft 59 which is connected to the gear 57 and is operated in direct relation to the movement of the cable 53 connected to the ram of the press.

In the preferred form of the machine the arms 64 and 65 and their co-operating mechanisms are shown in detail in Figures 11, 12, 14, 15 and 16.

The arm 64 is provided with a jointed section 66 at its outer end which is formed with an inwardly extending lug 67 which extends into the path of and is periodically engaged by a cam 68 extending outwardly from the side of the rim of the gear wheel 61. A coil compression spring 69, arranged between lugs 70 and 71 on the hinged section of the arm 64, permits the outer section 66 to swing outwardly when the lug 67 is engaged by the cam and as the highest end of the cam passes under the lug the spring snaps the arm section 66 inwardly to engage the outward end of a bar 72 which is pivotally mounted on a lug 73 secured on the side of the wheel 61. The bar 72 is radially arranged and has a forked inner end 74 which straddles the hollow shaft 60.

A flanged collar 75, loosely mounted on the shaft 60, is engaged by the fork 74 and the collar engages the end 76 of an offset lever 77 which is pivotally mounted intermediate of its length on a pin 78 mounted in a bracket 79 supported by a bar 80 mounted on the frame 52'.

The upper end of the lever 77 is forked to engage the grooved hub of a clutch disc 81 which is slidably keyed on a shaft 82 of the wire feeding mechanism. A clutch disc 83 is rotatably supported on the shaft 82 and is provided with a spur pinion 84 which is constantly in mesh with the gear 61.

Figures 11, 12:
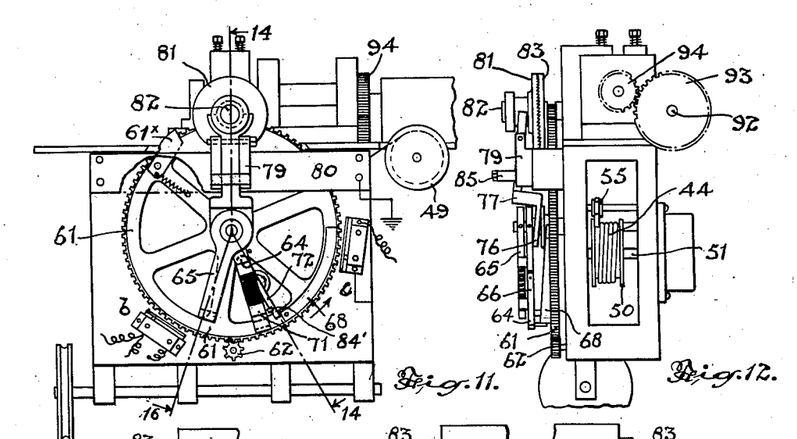
Figure 11 is an elevational view of the preferred control mechanism of the wire-feeding device.
Figure 12 is an end elevation of the mechanism shown in Figure 11.

It will be understood that as the gear 61 rotates in the direction indicated by arrow Figure 11 it brings the cam 68 into contact with the lug 67 of the hinged arm 66 and swings the spring-operated hinged section 66 outwardly and as the high terminal end of the cam passes from under the lug 67 the end 66 springs inward to strike the pivotal bar 72 which in turn swings the offset lever 77 on its pivot to move the clutch disc 81 non-rotatably mounted on the shaft 82 into contact with the constantly rotating clutch disc 83 geared to the wheel 61.

When the bar 72 is engaged by the lug of the arm 66 and operated thereby as described, the bar 72 is engaged and held by a spring latch 84' which holds the clutch in engagement to operate the shaft 82 and the wire feeding mechanism connected therewith as hereinafter described while the wheel 61 rotates until the latch 84' comes into contact with the arm 65. The latch, which is spring-held to hold the clutch-operating bar 72, on engaging with the arm 65 releases the bar 72 which releases the outer clutch disc, the lever 77 being swung on its pivot by a spring 85 mounted in an extension of the bracket 79.

It will be understood from this description that as the ram 7 of the press is lowered to compress a bundle placed on the bed 4, the cable 44 is unwound from the drum 50, thereby rotating the pinion 51' and through it the gear 58 which is mounted on the hollow shaft 60 and swings the arm 64 to a position relative to the thickness of the bundle. Concurrently the cable 53 permits the spring-operated drum 56 to rotate and the pinion 56' on its shaft rotates the gear 57 and through it the shaft 59 to which the arm 65 is secured and said arm is positioned relative to the size of the bundle. In other words, the arms 64 and 65 are moved to positions spaced apart relative to the thickness of the bundle, consequently the distance of travel of the wheel 61 from the point of dropping the arm 66 on to the clutch-operating arm 74 and the release of said arm from its holding latch, is regulated by the distance the arms 64 and 65 are spaced apart due to the thickness of the bundle.

A spur gear 86 is mounted upon the end of the shaft 82 opposite to that carrying the clutch discs (see Fig. 17) and said gear meshes with a spur gear 87 mounted on a shaft 88 arranged above the shaft 82.

Mounted upon the shafts 82 and 88 are the knurled wire feeding wheels 89 between which the wire to be used for bundling is passed. The upper of the wire feeders is preferably held in tight engaging contact with the wire under spring pressure. At the outer end of the shaft 82 is secured a bevelled gear 90 which meshes with a pinion 91 mounted on a shaft 92 arranged parallel with the guide 41.

The shaft 92 has mounted thereon a spur gear 93 which meshes with a spur gear 94 connected with a wire straightening device which is of a standard construction and need not be herein described.

The wire is fed from the serrated feeding wheels 89 through the straightening device and then passes along the grooved guide 41 into the cutting device 42. The wire passes over an anvil plate 95 in the cutting device and is then directed to the grooved members 10 and 8 under the bundle.

The cutting device which is moved backwards and forwards by the operation of the cable 44 slides on the member 41 and has mounted in a vertical guideway a cutter bar 96 which is adapted to press against the top of the wire over the anvil plate to sever the same. Connected to this cutter bar is a notching member 97 which is adapted to notch the wire in such a manner that it may be easily broken by bending when it is desired to open the bundle.

The cutter bar 96 is pivotally connected at its upper end to a lever 98 mounted on a pivot 99 on the frame of the cutter member. Attached to the lever 98 is a second lever 100 which engages a latch member 101 pivotally mounted on the lever 98. A hydraulic or air cylinder 102 is arranged beneath the lever 100 and its plunger is adapted to move upwardly to lift the lever 100 and carry with it the lever 98 which, swinging on its pivot 99, pushes downwardly upon the cutter bar to sever and notch the wire.

The latch member 101 is formed with a bevelled edge notch 103 which is engaged by a bevelled block 104 and as the compound lever described is lifted upwardly by the action of the plunger of the cylinder 102, the latch pulling against the bevelled surface 104 is swung on its pivot against the spring 105 until it releases the lever 100 which forms a break-joint connection. The cutter member is then released and it is returned to its normal position by the compression spring 106 surrounding the cutter bar 96 and allows the wire to be fed freely thereunder. The lever 100 is held in its downward position by a coil tension spring 107.

It will be readily understood that as the cutter member 42 is shifted back and forth on the guide 41 in direct relation to the thickness and width of the bundle due to its being connected with the cable 44 connected to the ram 7 it will be adjusted to measure the proper length of wire to encircle the bundle so that the ends of the wire will overlap on the top thereof to be gripped and welded together. The operation of the cutter member is effected through the compressed air cylinder 102, the operation of which will be hereinafter described.

In the feeding of the wire for securing the bundle it is necessary that the several operative members be in their proper position so that the wire will not be fouled. In order to accomplish the desired control of the wire feed mechanism an arrangement of control switches is provided as illustrated particularly in the diagram shown in Figure 20. In this diagram the frame 1, bed plate 4, cross-head or press 7 and wire-bending pistons 17 and 20 are shown in outline. Attached to the frame 1 adjacent to the top is a switch $a$ which has its movable element grounded to the frame and adapted to be engaged, to open the switch, by an obstruction arranged on the press plunger or cross head 7 when the plunger rises to its uppermost position. The fixed contact is wired in series with one terminal of a normally open switch $b$ arranged adjacent to and closed by a cam $61^x$ mounted on the gear wheel 61 of the wire feeding mechanism. The other terminal of the switch $b$ is connected through the coil of a relay R to an electric current transformer T.

Figure 20:
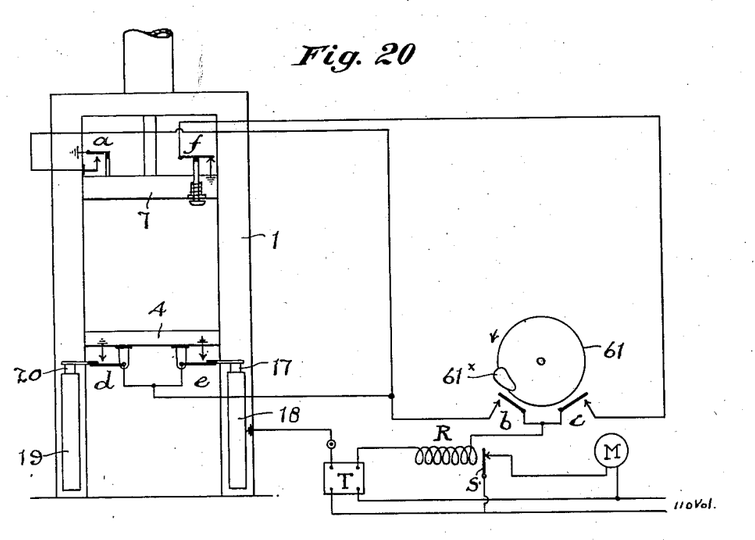
Figure 20 is a diagram of the wiring of the electric relays for controlling the wire feed mechanism illustrated in Figure 11.

Switches $d$ and $e$ are mounted on the bed plate 4 or other rigid part of the frame and grounded thereon and their movable parts are engaged and the switches are opened by the plungers 20 and 17 respectively when the plungers are moved to their lowermost retracted positions after a length of wire has been bent around a bundle and secured. The switches $d$ and $e$ are connected in parallel with the switch $a$ so that if any one of them remains closed the circuit will be grounded and the closing of the switch $b$ will not operate the relay R. A normally closed switch $f$ mounted on the plunger 7 and having its fixed contact grounded thereto is adapted to be opened when the plunger 7 is lowered into engagement with the bundle. The switch $f$ is connected in series with one terminal of a switch $c$ which is adapted to be closed by the operation of the gear 61 and the cam $61^x$. The other terminal of the switch $c$ is electrically connected through the coil of the relay R to the transformer T.

The switches $a$, $b$, $c$, $d$, $e$ and $f$ are all connected to the transformer T through the relay coil R. As the ram of the press moves downwardly to compress the bundle placed on the bed 4 it adjusts the relative positions of the arms 64 and 65 and also moves the wire cutter to the position to cut the wire the proper length, through the cables 44 and 53 as described. Simultaneously the switch *f* on the ram is opened by engagement with the bundle. The cutting of the wire takes place immediately after the clutch 81—83 of the wire feed has been disengaged by the latch 84' on the gear 61 engaging the arm 65 and freeing the spring-actuated clutch lever 77. Immediately following the cutting of the wire the rams 17 and 20 operate to fold the ends of the wires around the bundle. The ends are welded together, as will be hereinafter described.

The ram 7 then rises and the switch *f* automatically closes and switch *a* is opened when the ram reaches the top of its stroke. Simultaneously with the upward movement of the ram 7 the cylinders 18 and 19 are opened to exhaust the air and the rams 17 and 20 fall but they do not open the switches *d* and *e* until they reach the downward limit of their stroke and the grooved plates for folding the wire are back to their proper position to receive a new wire for another bundle.

Figure 21:
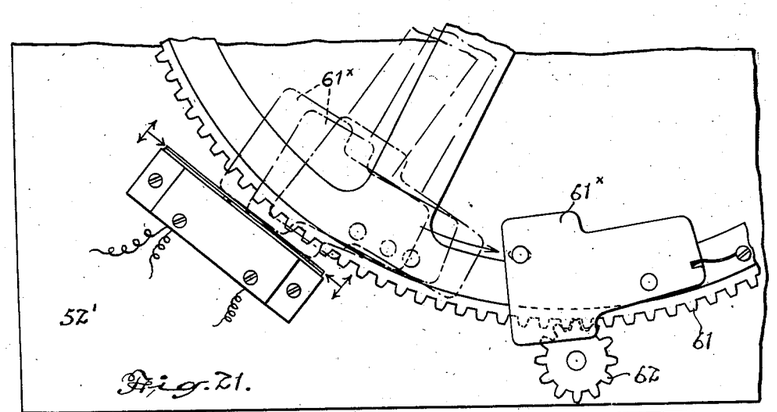
Figure 21 is an enlarged elevational detail of the switch controlling device operated by the main gear of the wire-feeding mechanism shown in the wiring diagram Fig. 20.

The switch S is closed and the motor is running and operates the gear 61. As the gear rotates, the cam 68 lifts the arm 64 then drops it to operate the lever 77 to close the clutch to again feed wire along the slot of the bar 41 until the cam 61ˣ (Figs. 21 and 20) on gear 61 engages the switch *b*, when the end of the wire being fed will have reached the point X (Figure 2) so that the wire will not be forced over the folder plate 16 and cause interference in the event of the plate 16 not being returned to its bottom position. When plates 16 and 21 reach the bottom of their stroke the switches *d* and *e* are opened and as switch *a* will have been previously opened by the upward movement of the ram 7, the switch S which is spring-operated, starts the motor.

It will be understood that as the arms 64 and 65 are moved to swing on their pivots by the operation of the ram 7 they will be returned to a zero position each time the ram moves upwardly, so also when the ram moves down on a new bundle the spacing of the arms is altered.

On the opening of the switch *a* and of *d* and *e* the motor starts and the wire feed is operated to feed the wire across the bed 4 to the point X' (Fig. 2) when the cam 61ˣ engages switch *c*, closing a circuit through the relay and stopping the motor.

It will be noted that while the ram 7 remains in pressure contact with the bundle the length of wire under the bundle fills the groove in the plates 16 and 21 but on the raising of the ram the spring of the released bundle pulls the wire clear of the grooves so that the next wire may be advanced through the groove. The switch *a* is therefore necessary to prevent the feeding of wire until the ram is raised from the bundle.

When the wire, which has passed beneath the bundle placed upon the base plate, has been cut and the ends folded upwardly and inwardly, the extremities thereof overlap and rest upon a fixed anvil plate 108 mounted on the ram. A movable jaw member 109 is pivotally mounted on an insulated bearing 110 in the bracket 111 carrying the plate 108, and it is adapted to be swung upon its pivot to move over and engage the overlapped wire ends, engaging the plate 108, as is shown particularly in Figure 7.

Figure 7:
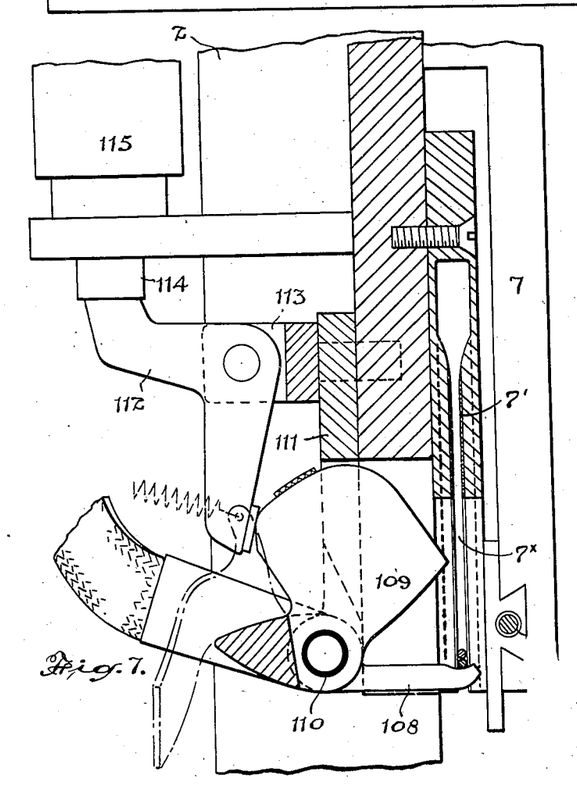
Figure 7 is an enlarged sectional detail of the means for welding the ends of the wires together.

Electric conduits are connected respectively to the fixed plate 108 and the movable jaw member 109. The current flowing thereto is adapted to be short-circuited through the wire upon the movable jaw coming into contact therewith to effect the welding of the wire.

The movable jaw member 109 is operated by means of a bell crank member 112 pivotally mounted on a bracket support 113 carried by the ram. The upper end of the bell crank is engaged by a plunger 114 mounted in a cylinder 115 carried on the ram. A manually operated plunger valve 116 is mounted on the top of the ram and it is connected to the cylinder 115 so that upon the depression of the valve, high pressure air is directed into the top of the cylinder 115 to move the plunger thereof downwardly and operate the jaw member 109 to effect the welding of the wire ends.

The valve 116 is manually operated and when released, is spring-returned to its normal position and allows the escape of air from the top of the cylinder. Detail of this valve is not shown as it is an ordinary piston valve construction.

Figures 1, 8:
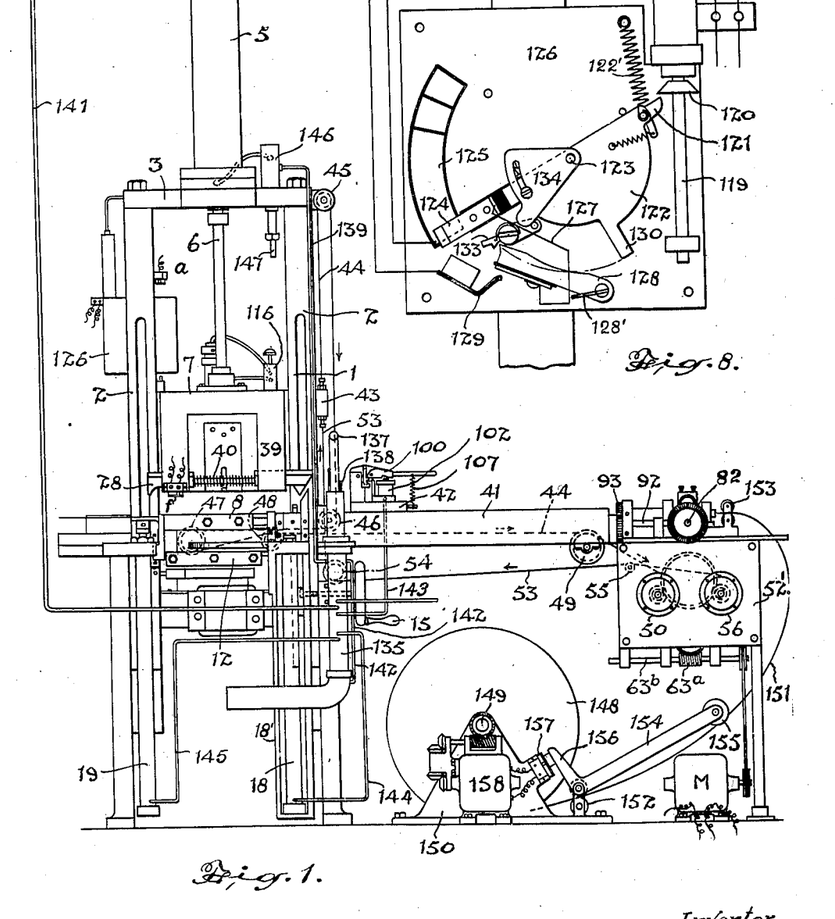
Figure 1 is a front elevational view of the machine.
Figure 8 is an elevational diagrammatic view of the mechanism for controlling the flow of current to the welding jaws illustrated in Figure 7.
Figures 2, 3:
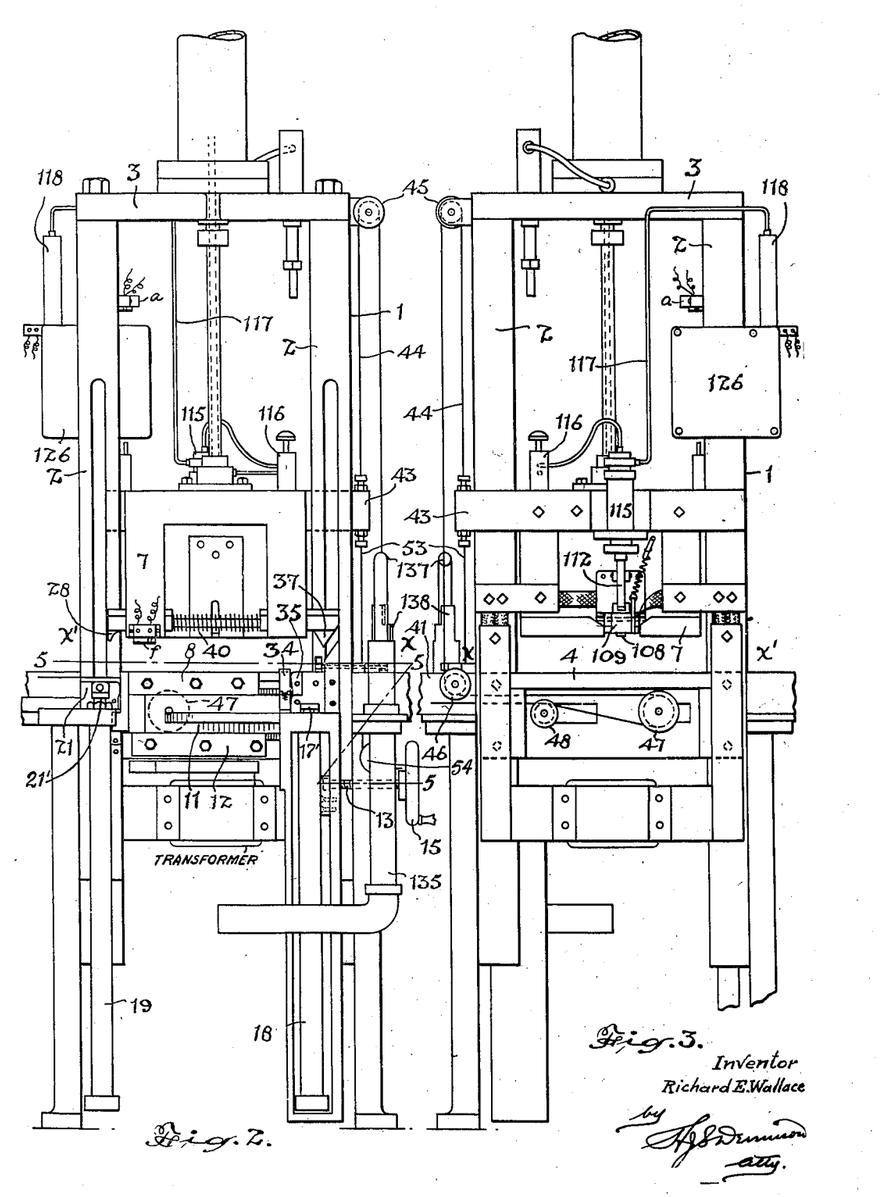
Figure 2 is an enlarged front elevational view of the press portion of the machine, as illustrated in Figure 1.
Figure 3 is an elevational view of the press portion of the machine taken from the opposite side to that shown in Figure 2.

The cylinder 115 is connected by a flexible pipe 117 to a cylinder 118 mounted on the frame 1 and compressed air flows to both cylinders simultaneously. A plunger 119 operating in the cylinder 118, as illustrated in detail in Figure 8, is provided with a bevelled collar 120 and is adapted on the downward movement of the plunger to engage a pivotal latch member 121 mounted on a spring-actuated quadrant member 122 pivotally mounted on a pin 123. The quadrant member has extending from the side opposite to the latch 121, a brush arm 124 which engages the contact plate 125 mounted on a supporting plate 126 and secured to the frame 1.

The brush arm 124 is electrically connected by a flexible wire 127 to a pivotal contact arm 128 mounted on the plate 126, which arm is adapted to engage a fixed brush contact 129 mounted on the plate 126. The cam plate 122 is provided with a lug extension 130, which upon the rotation of the cam plate, engages the arm 128 and swings it into engagement with the brush 129, thus closing an electrical connection between the brush 124 and the brush 129. The brush 129 and the contact plate 125 are connected by the leads 131 and 132 to a suitable switch in a welding transformer circuit and electric current is directed through the welding jaws previously described so that current will be directed through the welding contacts during the period that the brush 124 is travelling over the contact 125.

A spring-operated latch member 133 is mounted on the plate 126 to engage the contact arm 128 following its operation by contact with the lug 130 of the quadrant 122. This latch is released automatically on the return of the quadrant plate by means of an adjustable plate 134 mounted on the quadrant 122 which engages a pin on the latch 133 and swings it clear of the switch arm 128. This latch holds the arm in contact with the brush 129 until released by the return movement of the quadrant 122.

A fan or other suitable form of retarding device is mounted on the pin 123 which is rigidly connected to the quadrant 122 and retards the spring-operated return movement of said quadrant after it has been engaged and rotated by the collar 120 on the plunger 119. That is to say, when the plunger 119 is operated to move the collar 120 downwardly it engages the latch 121 swinging the quadrant on its pivot, moving the brush 124 out of contact with the live contact plate 125 and simultaneously moving the contact arm 128 into engagement with the brush 129.

When the collar 120 reaches a predetermined point in its downward travel it rides off the latch due to the arc of swing of the latch about the pivot 123, the quadrant being then free to return under the action of spring 122', thereby moving the brush onto the contact plate 125 and directing a flow of current to the welding jaws. The current continues to flow for a brief period until the lug plate 134 engages the latch 133 and releases the arm 128 which is then operated by spring 128' to clear the switch brush 129, thus breaking the circuit with a snap action and preventing the drawing of an arc. The brush member 124 clears the live contact 125 before arm 128 makes contact with brush 129.

The latch 121 is spring-urged in a clockwise direction to the normal position on the plate 126 represented in Figure 8 so that as the collar 120 moves upwardly to its normal position, it will ride over the latch as the latter yields so that the collar will be positioned in operative position above the latch ready for the next operation.

The operation of the several mechanisms herein described is preferably carried out by means of compressed air and in the valve control herein shown a valve cylinder 135 is suitably supported from the main frame of the machine in a vertical position. Within this valve cylinder (see Fig. 18) is arranged a piston valve 136 which controls suitable ports in the cylinder to direct compressed air to and from the several mechanisms in accordance with the movement of the valve.

Figure 18:
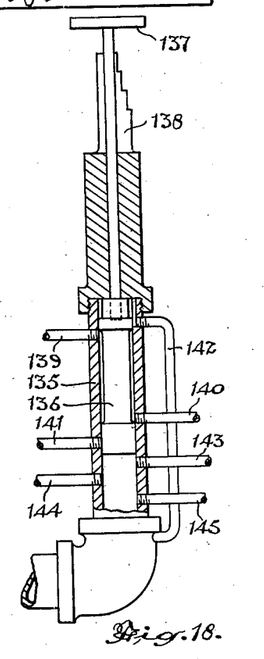
Figure 18 is an enlarged sectional elevational diagram of the main control valve.

The valve is provided at its upper end with a cross handle 137 which co-operates with a stepped stop member 138. When the handle is in the uppermost position the port opening to the pipe 139 leading to the bottom of the main cylinder 5 is connected with the compressed air inlet pipe 140, thus holding the ram raised. Upon pressing the plunger downwardly to engage the top of the member 138, the valve first closes the pipe 139 then opens a port to direct a flow of compressed air from the inlet pipe 140 to the pipe 141 leading to the top of the cylinder 5 thereby operating same to move the cross head 7 downwardly to compress the bundle that has been placed upon the bed plate 4. Simultaneously the upper end of the valve 136 connects the pipe 139 leading from the bottom of the ram, with an exhaust tube 142.

The next movement of the control valve 136 directs compressed air to the pipe 143 leading to the wire cutter cylinder 102 and following the operation of the cutter, air is directed to pipes 144 and 145 leading to the bottom end of the cylinders 18 and 19 respectively, thereby operating the rams 17 and 20 to move upwardly and to bend the ends of the wire alongside the vertical sides of the bundle and to cause the upwardly bent wires to be bent over the bundle in the manner described. On the upward movement after the bundle is tied the movement of the valve opens the various ports in the cylinder valve casing and exhausts the air.

In Figure 19 is shown a modified form of means for bending the upright ends of the wires over the bundle in which, in place of the upward thrust of the rams 17 and 20 causing the members 25 and 35 to be swung inwardly by pins thereon engaging cams mounted on the ram, the upward movement of the ram causes a bracket 21' mounted on the plate 21 to engage a lever l and operate a piston valve p in a cylinder p' to direct a flow of compressed air to a cylinder r to operate a plunger r' therein with a sudden downward movement, said plunger having mounted thereon a cam block 28', curved similarly to the cam 28, to engage the pin 27 of the wire bending block 25, the sudden impact having the effect of imparting a sharp bend to the wire.

Immediately following the inward folding of the wire ends over the top of the bundle, the operator manually operates the valve 116 to direct air pressure into the cylinder operating the welding jaws, and concurrently to the cylinder 113 which operates the control mechanism for the welding current.

Immediately following the welding of the tie, the upward operation of the main valve 136 cuts off the pressure to the top of the cylinder 5 and concurrently, a flow of compressed air is directed through the pipe 139 which is connected with a valve chamber 146 interposed in the pipe leading to the bottom of the main cylinder 5. The pressure flowing into the bottom of the main cylinder lifts the ram and the cross head, and the ram in its upward movement, operates the plunger 147 in the chamber 146 to cut off the pressure to the underside of the main cylinder before the ram reaches the top of its stroke thereby avoiding an excessive impact shock.

In the feeding of the wire to the machine it is desirable that it should pass freely to the feed rolls 89 and to accomplish such purpose, the wire, which is wound on a reel 148 mounted on a shaft 149 carried in a suitable frame 150 preferably arranged below the guide 41, extends in a loop 151 through guide rolls 152 adjacent to the reel 148 and adjacent to the feed rolls 153. An arm 154 preferably pivotally mounted on the support of the guide rolls 152 is provided with a grooved roller 155 at its outer end which rests against the wire loop 151 and said arm is formed with a lug extension 156 at its inner end which is adapted to engage an electric switch 157 to close an electric circuit to a motor 158 which is geared to the reel shaft 149 so that in the event of the loop 151 being drawn too tight the arm 154 will be operated to start the motor and effect the turning of the reel to relieve the tension on the wire. This reel-operating mechanism is preferably provided to avoid undue stress on the mechanism for feeding the wire to the baling mechanism.

A machine such as herein described may be utilized for bundling many different classes of goods but it is particularly adaptable for the bundling of newspapers where bundles of varying sizes in accordance with the orders of customers and agents along a certain delivery route are required.

In the operation of the machine the operator places the bundle to be bound on the bed plate. A length of wire for the size required for the minimum size of bundle has already been fed into position through the groove in the bed plate. The operator moves the main control valve 136 and the plunger of the press is moved down under compressed air pressure, pressing the papers of the bundle against the bed plate. Concurrently as the plunger moves downwardly the cables 44 and 53 operate the arms 64 and 65 arranged on the wire feeding mechanism and as the switch f carried on the plunger or ram 7 is closed through the upward movement of the small plunger carried on the ram, the motor M is started into operation, causing the rotation of the gear 61, and through the cam 68 carried thereby the clutch is operated to cause the further feeding of wire in accordance with the relative positioning of the arms 64 and 65, thus adding to the length of wire which has previously been fed under the bundle, so that the proper length of wire will be provided to encircle the bundle no matter what its size may be.

The operator then moves the main control valve to direct compressed air to the cutter which cuts the wire, and a further movement of the main valve then causes the operation of the rams 17 and 20 which bend the ends of the wire upwardly and inwardly and immediately following this operation the ends are welded together.

Following the welding the operator raises the valve 136 and compressed air is directed into the bottom of the main cylinder to lift the plunger 7.

The feeding of the minimum length of wire follows automatically during the raising operation of the main plunger so that if a second or more bindings are required to the same bundle time will not be lost between the operations waiting for the length of wire to feed into position as the feeding of the main length will take place during the return upward movement of the plunger and the feeding of the auxiliary length will take place on the downward movement of the plunger and only a momentary pause is required to add the additional length of wire which is again measured by the spacing of the arms 64 and 65 as described.

It will be noted that the bundle is compressed and the wire is folded around it and welded so that upon the release of the pressure the natural resilience of the material in the bundle causes the bindings to enclose it securely.

In the paper business this is rather important as the tightness of the wire binding prevents pilfering of papers from the bundle particularly when only one wire is used.

It will be readily understood that a mechanism such as herein described may be altered in many of its details without effecting any material change in the general functions of the machine which permit its operation in such a manner that bundles to be placed therein are compressed and tied securely very rapidly and in accordance with the size of the bundle any desired number of wrappings may be placed therearound and very securely and safely tied bundles are ensured.

What I claim as my invention is:

1. In a baling machine the combination with the ram and bed plate of a reciprocating press, of means operatively connected with the ram of said press for measuring lengths of wire in accordance with the size of the bundle in the press, means for feeding each measured length of wire under the bundle, means for cutting the lengths of wire, means for folding each measured length of wire around the bundle, and means for securing the ends of the wire together on top of the bundle.

2. In a baling machine the combination with the ram and bed plate of a reciprocating press, of means for feeding a length of wire through the press under a bundle, means operatively connected with the ram of the press for measuring the length of wire fed under the bundle, means for cutting the wire to the measured length, means for molding the ends of the wire upwardly at each side of the bundle and inwardly over the top thereof, and means for securing the ends of the wire together on the top of the bundle.

3. In a baling machine the combination with the ram and bed plate of a reciprocating press, of means for feeding a length of wire through the press under a bundle, means for controlling the operation of the wire feeding means, a cable connected with the ram of the press and operatively connected with said wire feed control means and pulled by the raising of the ram to regulate the stopping of the feed of wire across the bed plate, a cable connected with said ram and pulled by the lowering of the ram to regulate the starting of the subsequent feed of wire up to the bed plate, means for cutting the wire connected with the last-named cable, means for folding the ends of the wire around the bundle, and means for securing the ends of the wire together.

4. In a baling machine the combination with the ram and bed plate of a reciprocating press, of means for feeding a length of wire through the press under a bundle, motor driven means for operating said wire feeding means including a gear wheel, a clutch interposed between said gear wheel and the wire feeding means, means carried by the gear wheel for operating said clutch, adjustable means periodically engageable by said clutch-operating means for actuating said clutch operating means, means operatively connected with the ram of the press for adjusting said adjustable means to regulate the actuation of the clutch-operating means and the feed of wire in accordance with the size of bundle in the press, means for cutting the wire, means for folding the wire around the bundle, and means for securing the ends of the wire together.

5. A device as claimed in claim 4 in which the adjustable means periodically engageable by the means for operating the clutch comprises, an arm pivotally mounted adjacent to said gear wheel having a spring-actuated flexible portion adapted to be operated by the rotation of the gear wheel, a cam on the gear wheel to engage and flex said arm and to release same to engage and operate the clutch operating means carried by said gear wheel, an arm pivotally mounted adjacent to said gear wheel to release the clutch operating means carried by the gear wheel, and cable means connected with the ram of the press and operatively connected with said pivotal arms to adjust their positions for operating the clutch, said adjusted positions being determined by the size of the bundle.

6. A device as claimed in claim 4 in which the means for operating the wire feeding means comprises, a shaft on which a gear wheel is secured, a tubular shaft rotatable on the aforesaid shaft on which a second gear wheel is secured and upon which the gear recited in claim 4 is rotatably mounted, a latch mounted on the last-named gear wheel to hold the clutch-operating means on said gear wheel with the clutch in engagement, a cam on the gear wheel, an arm mounted on said tubular shaft having a flexible spring-operated extremity to be engaged by said gear cam and on release adapted to engage and operate said clutch-operating means, an arm mounted on said shaft and adapted to engage the latch to release the clutch-operating means, pinions meshing with the gear wheels mounted on said shafts, drums connected with said pinions, and cables wound on said drums and connected with the ram of the press to operate said arms in accordance with the size of the bundle.

7. A device as claimed in claim 4 in which the means operatively connected with the ram of the press for adjustably operating means to regulate the clutch operation and the feed of wire, includes a pair of rotatable arms mounted coaxially with the gear wheel, cables connected with the ram of the press to be pulled alternately by the downward and upward movement of the ram, means connecting the ends of said cables respectively with said rotatable arms, and a pivotal lever operated to effect the engaging of the clutch by one of said pivotal arms on the rotation of the gear wheel and operated through the medium of the other of said arms to disengage the clutch.

8. A device as claimed in claim 4 in which the wire feeding means comprises, a shaft operated through the motor-driven clutch, a serrated wheel mounted on said shaft, a bearing block spring-held toward said serrated wheel, a shaft mounted in said block and geared to the clutch shaft, a serrated wheel mounted on the shaft geared to the clutch shaft and mating with the aforesaid serrated wheel to grip and feed the wire, and a wire straightening device operatively connected to said wire-feeding means.

9. A device as claimed in claim 1 having means for guiding the measured length of wire across the bed plate and below the top thereof, means operable longitudinally of the press frame and at either side thereof for bending the ends of the wire upwardly along the sides of a bundle placed on the bed plate, means carried by the ram for bending the ends of the upturned wires inwardly over the bundle, and means for securing the ends of the wire together on the top of the bundle.

10. A device as claimed in claim 1 having means for guiding the measured length of wire across the bed plate and below the top thereof, means operable longitudinally of the press frame and at either side thereof for bending the ends of the wire upwardly along the sides of a bundle placed on the bed plate, means carried by the ram for bending the ends of the upturned wires inwardly over the bundle, means for gripping the wire in the means for guiding same across the bed plate while the ends of the wire are being bent alongside the bundle to effect sharp angle bends, and means for securing the ends of the wire together on the top of the bundle.

11. A device as claimed in claim 1 having means for guiding the measured length of wire across the bed plate and below the top thereof, means operable longitudinally of the press frame and at either side thereof for bending the ends of the wire upwardly along the sides of a bundle placed on the bed plate, said longitudinally operable wire-bending members being grooved in their inward sides to hold the bent ends of the wires parallel with the sides of the frame, means carried by the ram for bending the ends of the upturned wires inwardly over the bundle, and means for securing the ends of the wire together on the top of the bundle.

12. A device as claimed in claim 1 having means for guiding the measured length of wire across the bed plate and below the top thereof, means operable longitudinally of the press frame and at either side thereof for bending the ends of the wire upwardly along the sides of a bundle placed on the bed plate, pivotal blocks mounted on the upper and inner corners of the longitudinally operable wire-bending members, cams mounted on the press ram adapted to engage said pivotal blocks and swing same sharply inward to bend the wire over the top of the bundle, and means for securing the ends of the wire together on the top of the bundle.

13. A device as claimed in claim 1 having means for guiding the measured length of wire across the bed plate and below the top thereof, means operable longitudinally of the press frame and at either side thereof for bending the ends of the wire upwardly along the sides of a bundle placed on the bed plate, one of said longitudinally operable side members for bending the wire being mounted to move laterally in relation to the press frame to accommodate the machine and the bending of the wire to various widths of bundles, means carried by the ram for bending the ends of the upturned wires inwardly over the bundle, and means for securing the ends of the wire together on the top of the bundle.

14. A device as claimed in claim 1 having means for guiding the measured length of wire across the bed plate and below the top thereof, means operable longitudinally of the press frame and at either side thereof for bending the ends of the wire upwardly along the sides of a bundle placed on the bed plate, a bracket member mounted to slide transversely of the front of the bed plate and supporting one of said longitudinally movable wire-bending members, means for adjusting the position of said bracket in accordance with the width of the bundle, means carried by the ram for bending the ends of the upturned wires inwardly over the bundle, and means for securing the ends of the wire together on the top of the bundle.

15. A device as claimed in claim 1 having means for guiding the measured length of wire across the bed plate and below the top thereof, means operable longitudinally of the press frame and at either side thereof for bending the ends of the wire upwardly along the sides of a bundle placed on the bed plate, a guide bar extending laterally from one side of the press to the wire feeding means spaced therefrom, a wire cutting device slidably mounted on said guide bar, means controlling the wire feeding means, cables connecting the press ram with said wire feed control means, one of said cables being operatively connected with said wire cutting means to shift same on its guide bar relative to the size of the bundle, means carried by the ram for bending the ends of the upturned wires inwardly over the bundle, and means for securing the ends of the wire together on the top of the bundle.

16. A device as claimed in claim 1 having means for guiding the measured length of wire across the bed plate and below the top thereof, means operable longitudinally of the press frame and at either side thereof for bending the ends of the wire upwardly along the sides of a bundle placed on the bed plate, laterally adjustable means supporting one of said longitudinally operable wire bending means, a guide bar extending laterally from one side of the frame to the wire feeding means spaced therefrom, a wire cutting device slidably mounted on said guide bar, means for controlling the wire feeding means, a pulley guide arranged on the press frame above the ram, a pulley guide arranged on the frame adjacent to the bed plate, laterally adjustable means supporting one of the longitudinally operable wire bending means, a pulley guide mounted on said adjustable support, a cable connected at one end to the ram and extending around said pulley guides and connected to said wire cutting means and having its other end connected to said wire feed control means, a pulley guide mounted on the frame, a cable having one end connected to the ram and extending downwardly and around the latter pulley guide and having its other end connected to said wire feed control means, means carried by the ram for bending the ends of the upturned wires inwardly over the bundle, and means for securing the ends of the wire together on the top of the bundle.

17. A device as claimed in claim 1 in which the means for folding the ends of the wire around the bundle placed on the bed plate comprises means slidable longitudinally of the press frame, compressed air cylinders mounted on said slidable members carrying rams to operate said wire folding means, means for securing the ends of the wire wrapped around the bundle, a compressed air cylinder operating the press ram, and a main control valve adapted to selectively direct compressed air to the said ram cylinders to effect the compression of the bundle to wrap the wire around the bundle and to return the rams.

18. In a baling machine, the combination with the ram and bed plate of a reciprocating press, of a cylinder mounted on the top of said press, a ram operable from said cylinder to compress a bundle, means for measuring a length of wire in accordance with the size of the bundle, a wire cutting device, a compressed air cylinder having its plunger operatively connected with said wire cutter, means for placing the length of wire beneath the bundle, a pair of compressed air cylinders parallelly arranged on said frame, rams mounted in said cylinders to effect the wrapping of the wire around the bundle, means for securing the ends of the wire together, a main valve cylinder having a compressed air supply, and a valve operating in said cylinder and adapted to direct compressed air selectively to the outer and inner ends of the ram-operating cylinder to direct compressed air to operate the wire cutter and wire-bending rams and to exhaust the compressed air from said cylinders.

19. In a baling machine as claimed in claim 1, air pressure controlled means for gripping and holding the ends of the wire together in engaging contact, means for directing a welding current through said gripping means including a pivotal switch-operating member, a welding current control switch operated by said pivotal member, a contact brush carried by said pivotal member, a control circuit connected with said switch and contact brush, latch means for holding said switch closed, means for rotating said pivotal switch operating member, means on said pivotal member for releasing said latch, and compressed air operated means for operating said pivotal member concurrently with said gripping means.

20. A machine as claimed in claim 1 including a motor operably connected with said wire feeding means, disconnectable drive means arranged between said motor and said wire feeding means, a relay switch controlling the operation of said motor, switches co-operating with said rams controlling the operation of said relay switch, switches co-operating with the wire feeding means for controlling the relay switch, and means for securing the ends of the wire together over the bundle.

21. A machine as claimed in claim 1 including rams operable on said press frame for folding the wire around the bundle, a motor operably connected with said wire feeding means, disconnectable drive means arranged between said motor and said wire feeding means, switches on the press frame opened by said rams when in their fully retracted positions and connected in multiple with a current supply, a switch mounted on the frame and connected in multiple with the aforesaid ram switches and opened by the bundle pressing ram when in its fully raised position, a relay switch interposed between said power supply and said switches, a normally open switch interposed between said relay coil and the aforesaid switches, and means operative with the wire feeding means adapted to close said normally open switch.

22. A machine as claimed in claim 1 including rams operable on said press frame for folding the wire around the bundle, a motor operably connected with said wire feeding means, disconnectable drive means arranged between said motor and said wire feeding means, switches on the press frame opened by said rams when in their fully retracted positions and connected in multiple with a current supply, a switch mounted on the frame and connected in multiple with the aforesaid ram switches and opened by the bundle pressing ram when in its fully raised position, a relay switch interposed between said power supply and said switches, a normally open switch interposed between said relay coil and the aforesaid switches, means operative with the wire feeding means adapted to close said normally open switch, a normally open switch connected with the power supply through the relay coil and adapted to be closed by the operation of the wire feeding means following the operation of the aforesaid normally open switch, a switch connected with the latter normally open switch and mounted on the bundle-compressing ram and normally closed when the ram is raised clear of the bundle, and means adapted to be operated by contact with the bundle to open the latter switch.

23. In a baling machine, the combination with the ram and bed plate of a reciprocating press, a cylinder mounted on the top of said press, a ram operable from said cylinder to compress a bundle, a length of wire, means for placing the length of wire beneath the bundle, a pair of compressed air cylinders parallelly arranged on said frame, rams mounted in said cylinders to effect the wrapping of the wire around the bundle, means for securing the ends of the wire together, a main valve cylinder having a compressed air supply, and a valve operating in said cylinder and adapted to direct compressed air selectively to the outer and inner ends of the ram operating cylinder to direct compressed air to operate the wire-bending rams and to exhaust the compressed air from said cylinders.

RICHARD E. WALLACE.